(12) United States Patent
Huang

(10) Patent No.: US 12,325,541 B2
(45) Date of Patent: Jun. 10, 2025

(54) UNMANNED AERIAL VEHICLE ARM AND UNMANNED AERIAL VEHICLE

(71) Applicant: AUTEL ROBOTICS CO., LTD., Shenzhen (CN)

(72) Inventor: Chang Huang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 6 days.

(21) Appl. No.: 18/221,155

(22) Filed: Jul. 12, 2023

(65) Prior Publication Data

US 2024/0025572 A1 Jan. 25, 2024

(30) Foreign Application Priority Data

Jul. 25, 2022 (CN) .......................... 202221943661.4

(51) Int. Cl.
  *B64U 30/29* (2023.01)
(52) U.S. Cl.
  CPC .................................... *B64U 30/29* (2023.01)
(58) Field of Classification Search
  CPC ................................ B64U 30/29; B64U 10/14
  See application file for complete search history.

(56) References Cited

U.S. PATENT DOCUMENTS

| | | | |
|---|---|---|---|
| 2,980,365 A * | 4/1961 | Yohe | B64U 10/60 244/17.23 |
| 3,937,424 A * | 2/1976 | Meier | H01M 50/00 429/99 |
| 4,738,421 A * | 4/1988 | Green | G10K 11/006 343/705 |
| 10,017,249 B1 * | 7/2018 | Tseng | B64U 30/26 |
| 10,745,099 B2 * | 8/2020 | Long | B32B 3/08 |
| 11,597,516 B1 * | 3/2023 | Klinkmueller | B64U 80/40 |
| 11,869,363 B1 * | 1/2024 | Kunkel | B64U 50/19 |
| 2011/0038727 A1 * | 2/2011 | Vos | B64C 11/20 416/1 |
| 2012/0119016 A1 * | 5/2012 | Shaw | B64C 27/20 244/12.3 |
| 2013/0028377 A1 * | 1/2013 | Kovarik | B66F 11/042 378/59 |
| 2016/0023755 A1 * | 1/2016 | Elshafei | B64C 29/0033 244/17.23 |
| 2016/0244157 A1 * | 8/2016 | Welsh | B64G 1/10 |
| 2017/0297703 A1 * | 10/2017 | Thelen | B64D 31/06 |
| 2018/0134383 A1 * | 5/2018 | Schulz | B64U 10/14 |
| 2018/0170510 A1 * | 6/2018 | Brock | B64U 50/19 |

(Continued)

*Primary Examiner* — Medhat Badawi
(74) *Attorney, Agent, or Firm* — Arch & Lake LLP; Hao Tan; Shen Wang

(57) ABSTRACT

An unmanned aerial vehicle (UAV) includes a fuselage, a power driving unit, and an UAV arm. The UAV arm includes a cantilever, a mounting base, and a connecting portion. The mounting base is connected to a first end of the cantilever. The mounting base is configured for a power driving unit of the UAV to be mounted. The connecting portion is connected to a second end of the cantilever. The connecting portion is configured to be connected to the fuselage of the UAV. An upper end of a cross section of the cantilever is arc-shaped, and a lower end of the cross section of the cantilever is pointed. The cross section of the cantilever is a section perpendicular to a direction from the first end of the cantilever toward the second end of the cantilever.

16 Claims, 6 Drawing Sheets

(56) References Cited

U.S. PATENT DOCUMENTS

| | | | |
|---|---|---|---|
| 2018/0178922 A1* | 6/2018 | Pilskalns | B64U 30/292 |
| 2018/0236840 A1* | 8/2018 | Cantrell | G05B 6/02 |
| 2018/0327090 A1* | 11/2018 | De Chassey | A63H 27/12 |
| 2018/0339768 A1* | 11/2018 | Wang | B64U 30/26 |
| 2019/0016445 A1* | 1/2019 | Clark | F16L 3/015 |
| 2019/0112047 A1* | 4/2019 | Bowers | B64U 30/10 |
| 2019/0135420 A1* | 5/2019 | Regev | B64U 10/13 |
| 2019/0241259 A1* | 8/2019 | Tsutsumi | B64D 27/24 |
| 2020/0031458 A1* | 1/2020 | Strauss | B64U 30/12 |
| 2020/0140080 A1* | 5/2020 | Regev | B64C 29/0033 |
| 2020/0290752 A1* | 9/2020 | Kolosiuk | B64U 70/30 |
| 2020/0361602 A1* | 11/2020 | Cao | B64U 30/29 |
| 2020/0398968 A1* | 12/2020 | Sjostedt | B29C 70/025 |
| 2021/0024213 A1* | 1/2021 | Regev | B64C 27/027 |
| 2021/0285329 A1* | 9/2021 | Hunter | F03D 1/0641 |
| 2022/0097842 A1* | 3/2022 | Kunkel | B64D 27/24 |
| 2023/0055083 A1* | 2/2023 | Ka | G01C 17/38 |
| 2023/0055244 A1* | 2/2023 | Pal | B64U 30/29 |
| 2023/0056709 A1* | 2/2023 | Suzuki | B64U 10/14 |
| 2023/0227185 A1* | 7/2023 | Nys?Ter | B64U 50/19 244/119 |
| 2024/0025572 A1* | 1/2024 | Huang | B64U 30/29 |
| 2024/0083603 A1* | 3/2024 | Schlak | B64C 29/0025 |
| 2024/0092481 A1* | 3/2024 | Mulligan | B63H 1/26 |
| 2024/0158111 A1* | 5/2024 | Ol | B64U 50/23 |
| 2024/0166385 A1* | 5/2024 | Turner | B64U 20/80 |
| 2024/0174386 A1* | 5/2024 | Li | B64U 20/83 |

\* cited by examiner

UNMANNED AERIAL VEHICLE ARM AND UNMANNED AERIAL VEHICLE

CROSS REFERENCE TO RELATED APPLICATION

This application claims priority of Chinese Patent Application No. 202221943661.4, filed on Jul. 25, 2022 and entitled "Unmanned Aerial Vehicle (UAV) Arm and UAV," the entire disclosure of which is incorporated herein by reference for all purposes.

BACKGROUND

With increasingly more extensive use of unmanned aerial vehicles (UAVs), autonomous operation of the UAV is gradually replacing manual operation in many fields such as power inspection and security search and rescue. Especially in the field of power inspection, the UAV needs to have enough endurance to complete long-distance and time-consuming inspection tasks.

At present, arms of the UAV have a long columnar structure with square and round cross sections, which has a poor aerodynamic effect, resulting in relatively large wind resistance and affecting flight endurance.

SUMMARY

Embodiments of the present disclosure relate to the technical field of unmanned aerial vehicles (UAVs), and in particular, to an UAV arm and an UAV, which overcome or at least partially solve the above problems.

According to an aspect of the present disclosure, an UAV arm is provided by some embodiments. The UAV arm includes a cantilever, a mounting base, and a connecting portion. The mounting base is connected to a first end of the cantilever, and the mounting base is configured for a power driving unit of the UAV to be mounted. The connecting portion is connected to a second end of the cantilever, and the connecting portion is configured to be connected to a fuselage of the UAV. An upper end of a cross section of the cantilever is arc-shaped, and a lower end of the cross section of the cantilever is pointed. The cross section of the cantilever is a section perpendicular to a direction from the first end of the cantilever toward the second end of the cantilever.

According to another aspect of the present disclosure, an UAV is provided by some embodiments. The UAV includes a fuselage, a power driving unit, and the UAV arm according to the above aspect of the present disclosure. The power driving unit is mounted to the mounting base, and the connecting portion is connected to the fuselage.

In the embodiments of the present disclosure, the UAV arm includes a cantilever, a mounting base and a connecting portion. The mounting base is connected to the first end of the cantilever. The mounting base is configured for the power driving unit of the UAV to be mounted. The connecting portion is connected to the second end of the cantilever, and the connecting portion is configured to be connected to the fuselage of the UAV. An upper end of a cross section of the cantilever is arc-shaped, and a lower end of the cross section of the cantilever is pointed. The cross section of the cantilever is a section perpendicular to a direction from the first end of the cantilever toward the second end of the cantilever. Since the upper end of the cross section of the cantilever is arc-shaped, and the lower end of the cross section of the cantilever is pointed, the cantilever plays a role in guiding airflow during the level flight of the UAV, which facilitates reduction in wind resistance.

BRIEF DESCRIPTION OF THE DRAWINGS

In order to describe the technical solutions of embodiments of the present disclosure more clearly, the accompanying drawings required for use in the embodiments of the present disclosure are briefly described below. Apparently, the accompanying drawings described below show only some embodiments of the present disclosure, and a person of ordinary skill in the art may still derive other accompanying drawings from the accompanying drawings without creative efforts.

DETAILED DESCRIPTION

For ease of understanding the present disclosure, the present disclosure is described in more detail below with reference to the accompanying drawings and specific embodiments. It should be noted that, when an element is expressed as "being fixed to" another element, the element may be directly on the another element, or one or more intermediate elements may exist between the element and the another element. When one element is expressed as "being connected to" another element, the element may be directly connected to the another element, or one or more intermediate elements may exist between the element and the another element. The terms "vertical", "horizontal", "left", "right" and similar expressions used in this specification are merely used for the purpose of description.

Unless otherwise defined, meanings of all technical and scientific terms used in this specification are the same as that usually understood by a person skilled in the technical field to which the present disclosure belongs. In this specification, terms used in the specification of the present disclosure are merely intended to describe objectives of the specific embodiments, but are not intended to limit the present disclosure. A term "and/or" used in this specification includes any or all combinations of one or more related listed items.

Figure 1:
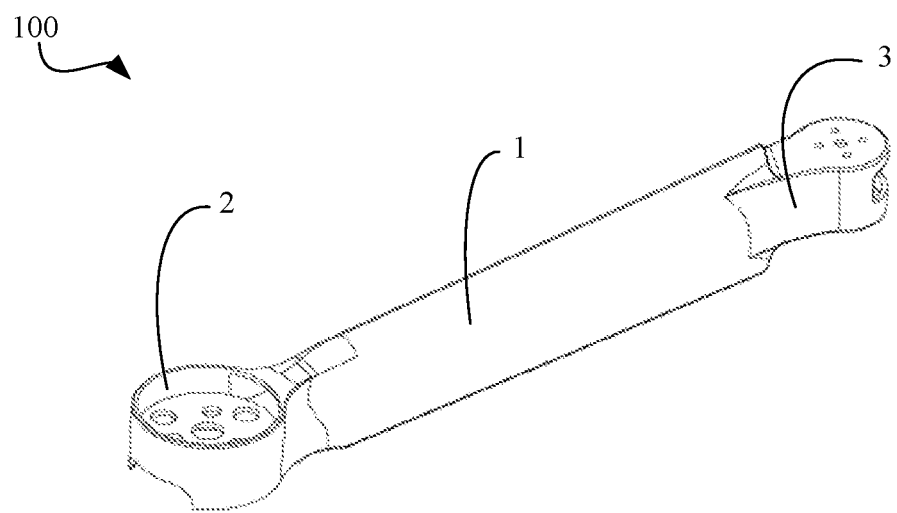
FIG. 1 is a three-dimensional view of an UAV arm according to an embodiment of the present disclosure.

Referring to FIG. 1, an unmanned aerial vehicle (UAV) arm 100 includes a cantilever 1, a mounting base 2, and a connecting portion 3. The mounting base 2 is connected to a first end of the cantilever 1, and the mounting base 2 is configured for a power driving unit 102 (shown in FIG. 9) of an unmanned aerial vehicle (UAV) 1000 to be mounted. The connecting portion 3 is connected to a second end of the cantilever 1, and the connecting portion 3 is configured to be connected to a fuselage of the UAV 1000. The cantilever 1 is configured to support the power driving unit 102 mounted to the mounting base 2.

Figure 2:
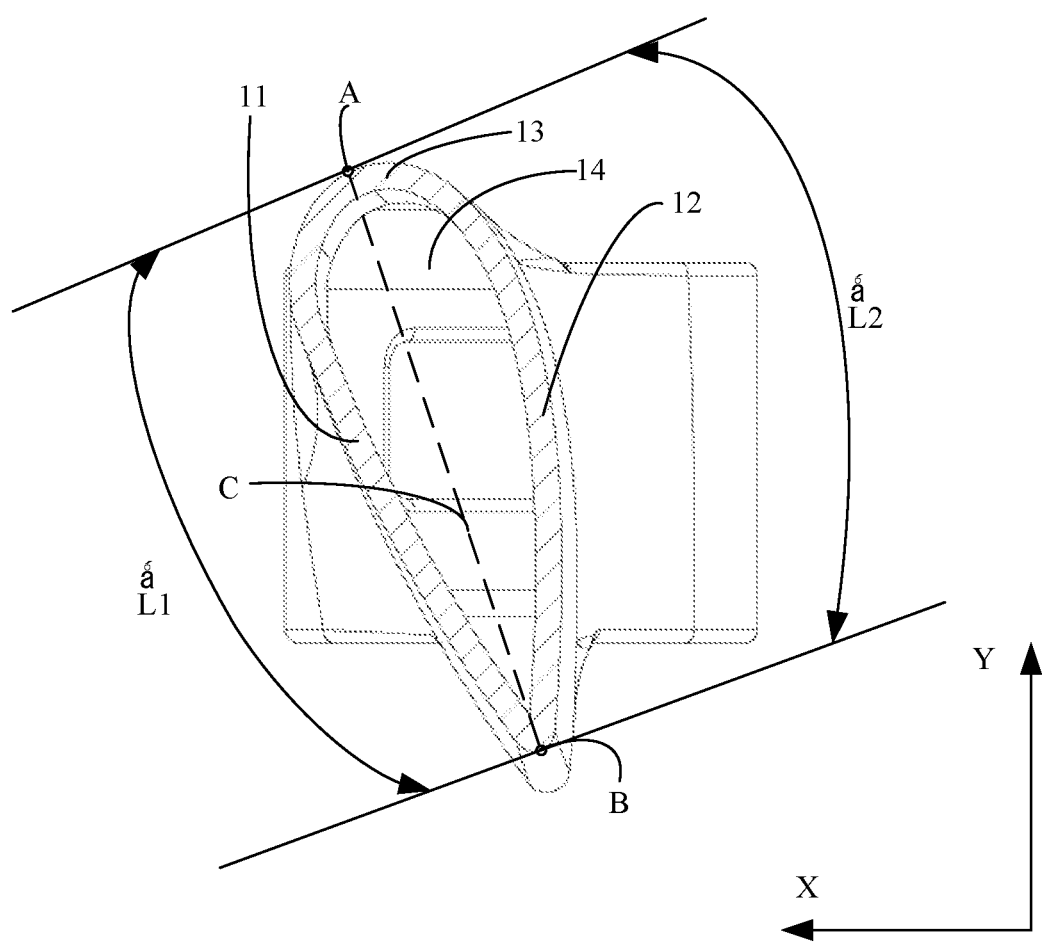
FIG. 2 is a cross-sectional view of the UAV arm shown in FIG. 1.

For the cantilever 1, referring to FIG. 1 and FIG. 2, the cantilever 1 includes a first side wall 11, a second side wall 12, and an arc-shaped plate 13. The first side wall 11 and the second side wall 12 are each provided with a first end and a second end opposite to each other. One end of the arc-shaped plate 13 is connected to the first end of the first side wall 11, another end of the arc-shaped plate 13 is connected to the first end of the second side wall 12, and the second end of the first side wall 11 is connected to the second end of the second side wall 12. The arc-shaped plate 13, the first side wall 11, and the second side wall 12 jointly define a cavity 14. The arc-shaped plate 13, the first side wall 11, and the second side wall 12 protrude outward in a direction away from the cavity 14. Surfaces of the arc-shaped plate 13, the first side wall 11 and the second side wall 12 away from the cavity 14 are all smooth curved surfaces, surfaces of joints of the arc-shaped plate 13 and the first side wall 11 and the second side wall 12 facing away from the cavity 14 are all smooth curved surfaces, and a surface of a joint of the first side wall 11 and the second side wall 12 facing away from the cavity 14 is a smooth curved surface. A shape of an outer surface of the cantilever 1 is streamlined.

In some embodiments, an upper end of a cross section of the cantilever 1 is arc-shaped, and a lower end of the cross section of the cantilever 1 is pointed. A chord line C of the cross section of the cantilever 1 divides the cross section of the cantilever 1 into two parts: a left cross section and a right cross section. A contour line length of the left cross section is L1, a contour line length of the right cross section is L2, contour lines of the left cross section and the right cross section are arc-shaped, and the cross section of the cantilever 1 is generally in the shape of a water drop. The contour lines of the left cross section and the right cross section both protrude outward, a radian by which the contour line of the left cross section protrudes outward is less than a radian by which the contour line of the right cross section protrudes outward, and the contour line length L1 of the left cross section is less than the contour line length L2 of the right cross section. The cross section of the cantilever 1 is a section perpendicular to a direction from the first end of the cantilever 1 toward the second end of the cantilever 1. One end of the cross section of the cantilever 1 facing a Y direction is the upper end of the cross section of the cantilever 1, and another end of the cross section of the cantilever 1 facing a direction opposite to the Y direction is the lower end of the cross section of the cantilever 1. A pointed point at the lower end of the cross section of the cantilever 1 is a first end point A, a point at the upper end of the cross section of the cantilever 1 farthest from the first end point A is a second end point B, and the chord line C is a connection line between the first end point A and the second end point B.

When the UAV arm 100 is mounted to the fuselage of the UAV 1000 through the connecting portion 3, the cantilever 1 is arranged obliquely, and the chord line C of the cross section of the cantilever 1 is inclined toward an X direction.

Figure 3:
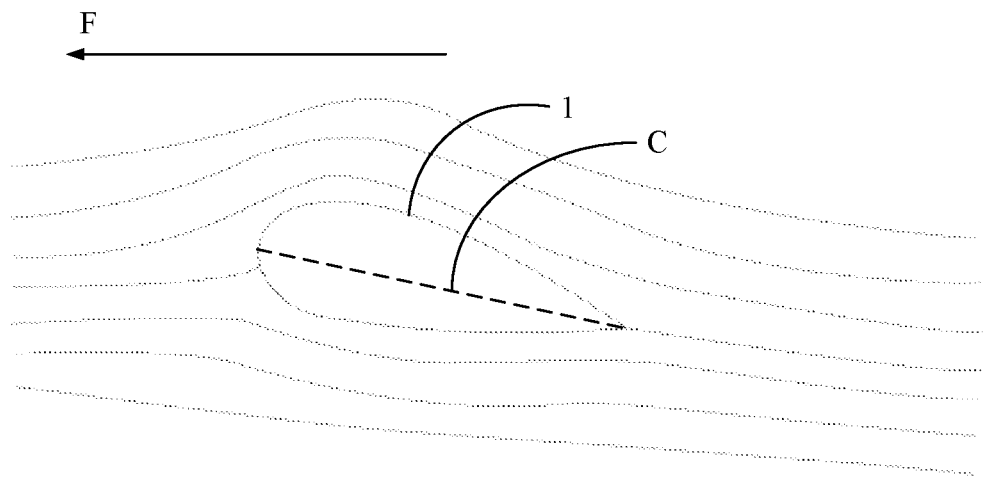
FIG. 3 is a schematic diagram showing that airflow passes through a cantilever surface when an UAV arm is assembled on an unmanned aerial vehicle (UAV), and the UAV flies in a forward direction of the UAV, according to an embodiment of the present disclosure.
Figure 4:
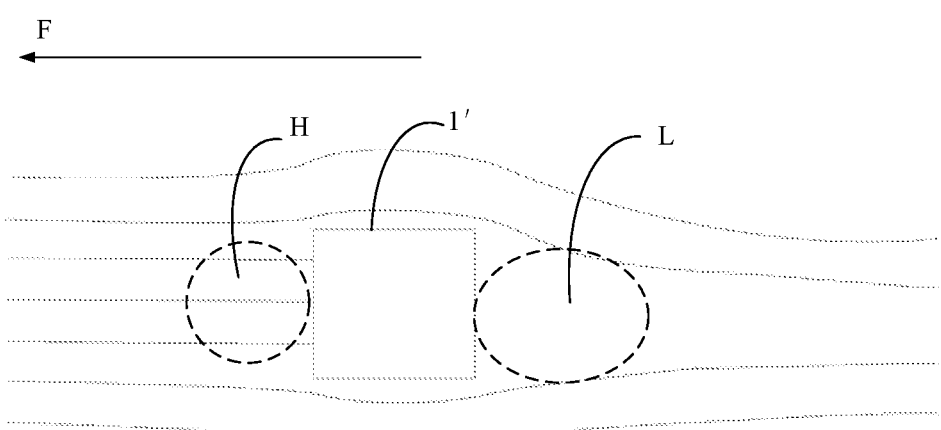
FIG. 4 is a schematic diagram showing that airflow passes through a conventional cantilever surface when a conventional arm is assembled on a UAV, and the UAV flies in a forward direction of the UAV.
Figure 5:
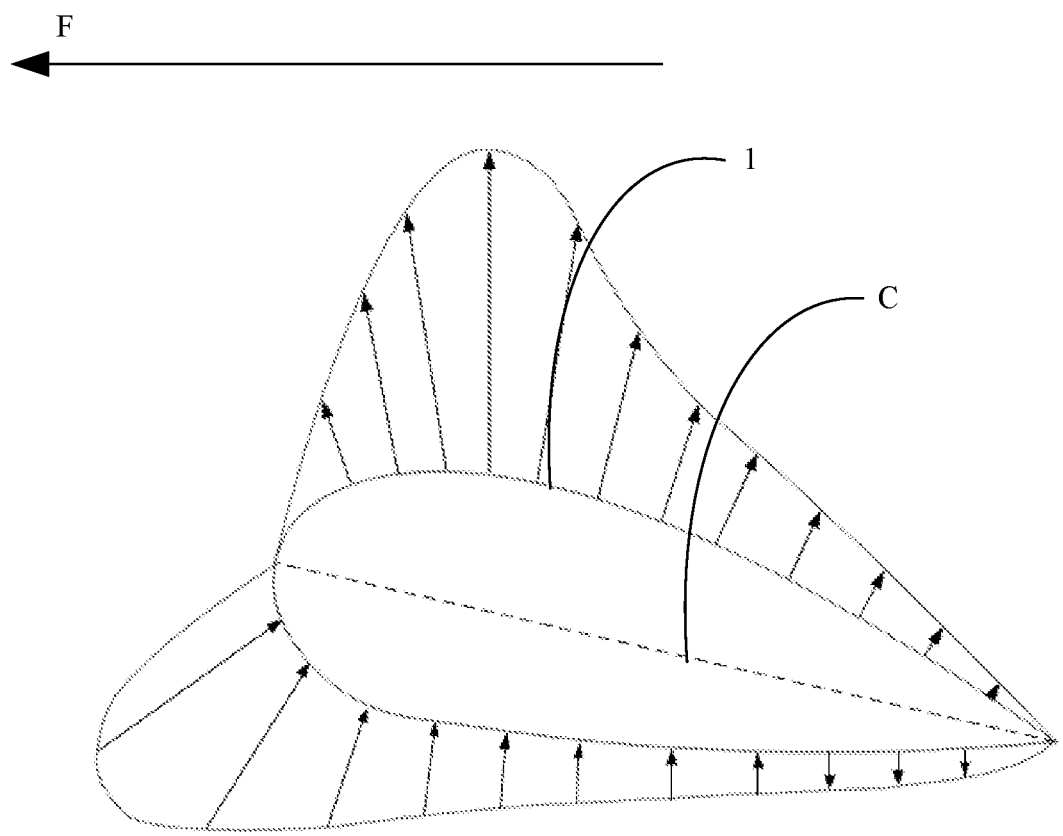
FIG. 5 is a schematic diagram showing a distribution of pressure stress generated on the cantilever surface when an UAV arm is assembled on a UAV, and the UAV flies in a forward direction of the UAV, arrows in the figure indicating directions of the pressure stress, according to an embodiment of the present disclosure.

Referring to FIG. 3, FIG. 4, and FIG. 5, when the UAV 1000 flies forward, the UAV 1000 is inclined with the UAV 1000 toward a direction F in which the UAV 1000 flies forward. In this case, an upper end of the cantilever 1 is inclined toward the direction F in which the UAV 1000 flies forward, and an end of the cantilever 1 in the direction Y is the upper end of the cantilever 1. Compared with the UAV 1000 in a horizontal hovering state, an area of a projection of the cantilever 1 in the direction F in which the UAV 1000 flies forward is reduced, so that a windward area of the UAV 1000 when flying forward is reduced, and air resistance of the UAV 1000 when flying forward is further reduced. A cross section of a conventional cantilever 1' is square or round. As shown in FIG. 4, when the UAV 1000 flies forward, airflow is obviously separated after encountering the surface of the cantilever 1', and a high pressure area H is generated on a windward surface of the cantilever 1', and a low pressure area L is generated on a leeward surface of the cantilever 1', so that a larger pressure drag is generated in the direction opposite to the flying direction of the UAV 1000. As shown in FIG. 3, since the cross section of the cantilever 1 provided in this embodiment is in the shape of a water drop, the upper end of the cantilever 1 is inclined toward the direction F in which the UAV 1000 flies forward. In this case, the end of the cantilever 1 facing the direction in which the UAV 1000 flies forward is an arc-shaped curved surface, and a width of the cantilever 1 is gradually reduced in the direction away from the direction in which the UAV 1000 flies forward, so that the airflow is easier to be close to the surface of the cantilever 1 and flow backward. Compared with the conventional cantilever 1 with non-streamlined design, the airflow passing through the surface of the cantilever 1 is not obviously separated, and therefore the pressure drag is smaller. When the UAV 1000 is flying forward, since the cross section of the cantilever 1 is in the shape of a water drop, and an included angle is formed between the chord line c of the cross section of the cantilever 1 and the direction in which the UAV 1000 flies forward. According to the principle of aerodynamics, when the airflow passes through the cantilever 1, the pressure below the cantilever 1 is high and the pressure above the cantilever 1 is low, and the pressure stress distribution on the surface of the cantilever 1 is shown in FIG. 5, thereby generating an upward resultant force on the cantilever 1, that is, lift force.

When the UAV 1000 takes off, the upper end of the cantilever 1 faces a direction in which the UAV 1000 flies vertically upward, and the cross section in the shape of a water drop and the streamlined outer surface of the cantilever 1 enable surface layer airflow of the UAV 1000 in the vertical upward flight direction to flow downward close to the surface of the cantilever 1, so that the UAV 1000 receives less resistance when taking off.

In some embodiments, when a power driving unit 102 of the UAV 1000 is fixed to the mounting base 2, the power driving unit 102 is located above the cantilever 1. When the UAV 1000 is in a hovering state, the power driving unit 102 generates, during operation, airflow in a direction opposite to the direction in which the UAV 1000 flies vertically upward. The cross section in the shape of a water drop, and the streamlined outer surface of the cantilever 1 enable the airflow generated by the power driving unit 102 to flow downward close to the surface of the cantilever 1, and the pressure drag of the airflow blown by the power driving unit 102 to the cantilever 1 that is applied to the cantilever 1 is less than that applied to the conventional cantilever 1.

Based on the above, the cross section in the shape of a water drop, and the streamlined outer surface of the cantilever 1 enable the UAV arm 100 to receive less resistance during the flight of the UAV 1000, and the cantilever 1 may provide lift force when the UAV 1000 flies forward. Compared with the conventional cantilever, the UAV 1000 equipped with the cantilever 1 provided in this embodiment has a longer endurance.

Figure 6:
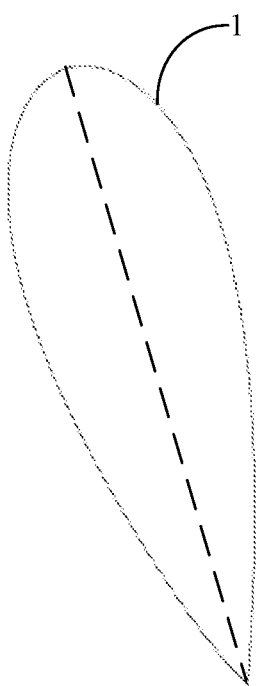
FIG. 6 is a schematic diagram of a cross-sectional shape of a cantilever according to an embodiment of the present disclosure.
Figure 7:
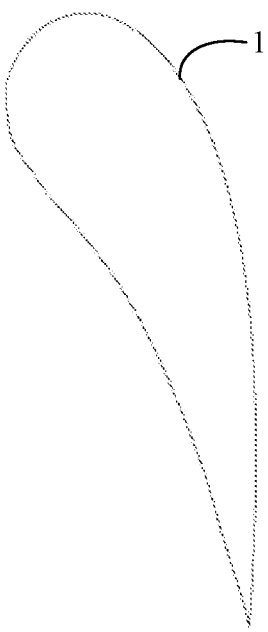
FIG. 7 is a schematic diagram of a cross-sectional shape of a cantilever according to an embodiment of the present disclosure.
Figure 8:
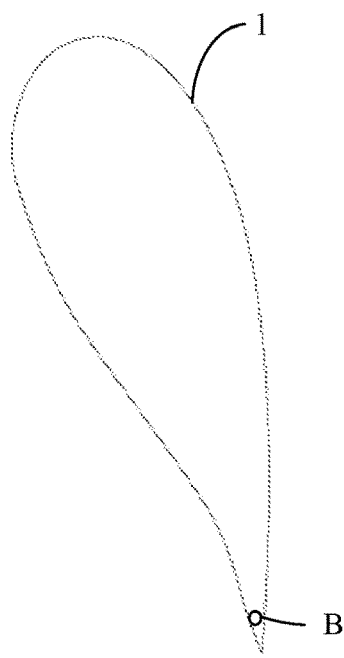
FIG. 8 is a schematic diagram of a cross-sectional shape of a cantilever according to an embodiment of the present disclosure.

It may be understood that in some other embodiments, the contour line length L1 of the left cross section is not limited to be less than the contour line length L2 of the right cross section, and the contour line of the left cross section and the contour line of the right cross section are not limited to both protruding outward. The shape of the cross section of the cantilever 1 may further be a shape in which the left cross section and the right cross section are symmetrical, as shown in FIG. 6; or may be a shape in which the contour line of the left cross section is recessed toward the right cross section, as shown in FIG. 7; or may be a shape in which the contour line of the left cross section close to a second end point B is recessed toward the right cross section, as shown in FIG. 8.

In some embodiments, further, in order to meet the demand of power inspection industry, the UAV arm 100 is made of glass fiber. Glass fiber is an inorganic nonmetallic material, which has the characteristics of good insulation, strong heat resistance, good corrosion resistance, and high mechanical strength. When the UAV arm 100 collides with electric power facilities such as wires due to an accident of the UAV, the insulation performance of glass fiber can effectively reduce the risk of short-circuit fire and avoid secondary accidents.

In some embodiments, the UAV arm 100 is made of glass fiber. In order to meet the requirements of strength and light weight simultaneously, a thickness of each of the first side wall 11, the second side wall 12 and the arc-shaped plate 13 is in a range of 0.9 mm to 1.2 mm. It may be understood that when the UAV arm 100 is made of other materials, the thickness of each of the first side wall 11, the second side wall 12, and the arc-shaped plate 13 may be adjusted based on actual conditions.

In this embodiment, further, in order to prevent the UAV arm 100 from being scratched due to collision with foreign objects, an outer surface of the UAV arm 100 is covered with a layer of UV (Ultra Violet) varnish as a protective coating to protect the UAV arm 100, and the UV varnish is a transparent coating with high gloss characteristics, which can improve aesthetics of the UAV arm 100.

In some embodiments of the present disclosure, the UAV arm 100 includes a cantilever 1, a mounting base 2, and a connecting portion 3. The mounting base 2 is connected to the first end of the cantilever 1. The mounting base 2 is configured for the power driving unit 102 of the UAV 1000 to be mounted. The connecting portion 3 is connected to the second end of the cantilever 1, and the connecting portion 3 is configured to be connected to the fuselage of the UAV 1000. An upper end of a cross section of the cantilever 1 is arc-shaped, and a lower end of the cross section of the cantilever 1 is pointed. The cross section of the cantilever 1 is a section perpendicular to a direction from the first end of the cantilever 1 toward the second end of the cantilever 1. Since the upper end of the cross section of the cantilever 1 is arc-shaped, and the lower end of the cross section of the cantilever 1 is pointed, the cantilever plays a role in guiding airflow during the level flight of the UAV 1000, which facilitates reduction in wind resistance.

Figure 9:
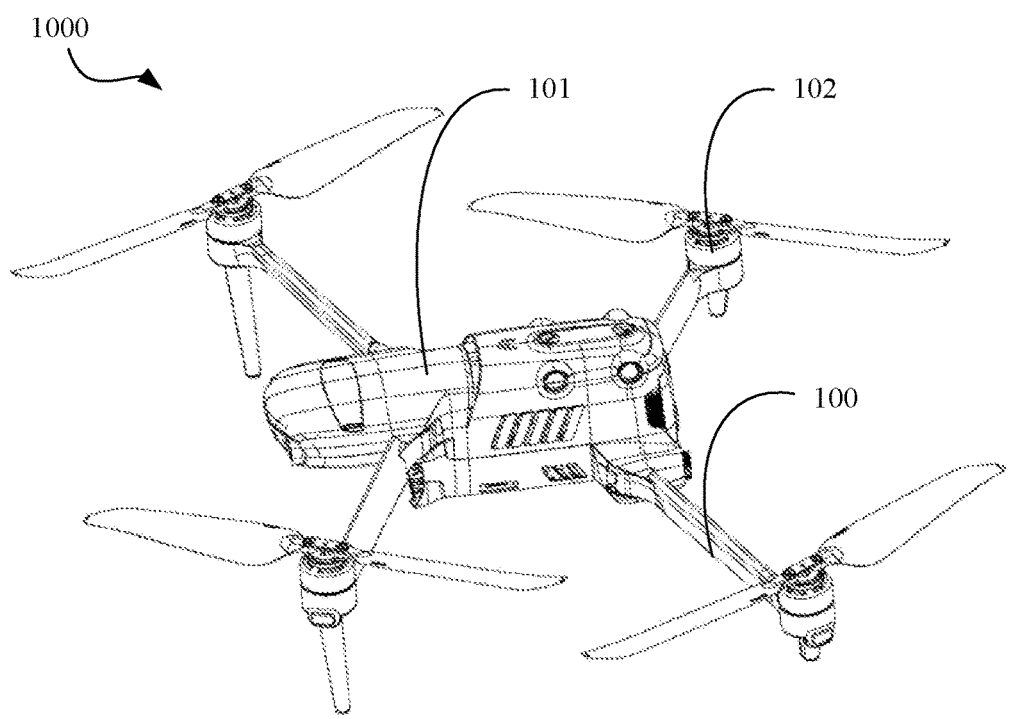
FIG. 9 is a three-dimensional view of a UAV according to an embodiment of the present disclosure.

An embodiment of the present disclosure further provides a UAV 1000. As shown in FIG. 9, the UAV 1000 includes the UAV arm 100 as described above, a fuselage 101 and a power driving unit 102 described above. For the structure and functions of the UAV 1000, reference is made to the above embodiments, and the details are not described herein again.

It should be noted that, preferred embodiments of the present disclosure are provided in the description of the present disclosure and the accompanying drawings, but the present disclosure can be implemented in many different forms, and are not limited to the described embodiments of the specification. These embodiments are not used as additional limitations on the content of the present disclosure, and the purpose of providing these embodiments is to make the understanding of the disclosure of the present disclosure more thorough and comprehensive. Moreover, the above technical features continue to be combined with each other to form various embodiments not listed above, which are all deemed to be within the scope of the description of the present disclosure. Further, a person of ordinary skill in the art may make improvements or transformations according to the above description, and all of the improvements and transformations shall fall within the protection scope of the attached claims of the present disclosure.

What is claimed is:

1. An unmanned aerial vehicle (UAV) arm, comprising:
   a cantilever having a first end and a second end;
   a mounting base, connected to the first end of the cantilever, and configured for a power driving unit of an UAV; and
   a connecting portion, connected to the second end of the cantilever, and connected to a fuselage of the UAV;
   wherein an upper end of a cross section of the cantilever is arc-shaped, a lower end of the cross section of the cantilever is pointed, and the cross section of the cantilever is a section generally perpendicular to a direction from the first end of the cantilever toward the second end of the cantilever; and
   the cantilever is obliquely arranged, and the upper end is inclined toward a direction in which the UAV flies forward.

2. The UAV arm according to claim 1, wherein the cantilever satisfies that:
   a contour line length L1 of a left cross section is less than a contour line length L2 of a right cross section; and
   the left cross section and the right cross section are parts of the cross section of the cantilever located on two sides of a chord line, wherein the chord line is a connection line between a first end point and a second end point, the first end point is a pointed point at a lower end of the cross section of the cantilever, and the second end point is a point at an upper end of the cross section of the cantilever and farthest away from the first end point.

3. The UAV arm according to claim 1, wherein a shape of an outer surface of the cantilever is streamlined.

4. The UAV arm according to claim 1, wherein the cantilever comprises a cavity.

5. The UAV arm according to claim 4, wherein the cantilever comprises a first side wall, a second side wall, and an arc-shaped plate, and each of the first side wall and the second side wall comprising a first end and a second end opposite to each other, wherein one end of the arc-shaped plate is connected to the first end of the first side wall, another end of the arc-shaped plate is connected to the first end of the second side wall, the second end of the first side wall is connected to the second end of the second side wall, and the arc-shaped plate, the first side wall, and the second side wall jointly define the cavity.

6. The UAV arm according to claim 5, wherein a thickness of each of the first side wall, the second side wall, and the arc-shaped plate is in a range of 0.9 mm to 1.2 mm.

7. The UAV arm according to claim 1, wherein the UAV arm is made of an insulating material.

8. The UAV arm according to claim 1, wherein an outer surface of the UAV arm is covered with a protective coating.

9. An unmanned aerial vehicle (UAV), comprising a fuselage, a power driving unit, and an UAV arm,
wherein the UAV arm comprises:
a cantilever having a first end and a second end;
a mounting base, connected to the first end of the cantilever, and configured for a power driving unit of the UAV; and
a connecting portion, connected to the second end of the cantilever, and connected to a fuselage of the UAV;
wherein an upper end of a cross section of the cantilever is arc-shaped, a lower end of the cross section of the cantilever is pointed, and the cross section of the cantilever is a section perpendicular to a direction from the first end of the cantilever toward the second end of the cantilever; and
the cantilever is obliquely arranged, and the upper end is inclined toward a direction in which the UAV flies forward.

10. The UAV according to claim 9, wherein the cantilever satisfies that:
a contour line length L1 of a left cross section is less than a contour line length L2 of a right cross section; and
the left cross section and the right cross section are parts of the cross section of the cantilever located on two sides of a chord line, wherein the chord line is a connection line between a first end point and a second end point, the first end point is a pointed point at a lower end of the cross section of the cantilever, and the second end point is a point at an upper end of the cross section of the cantilever and farthest away from the first end point.

11. The UAV according to claim 9, wherein a shape of an outer surface of the cantilever is streamlined.

12. The UAV according to claim 9, wherein the cantilever comprises a cavity.

13. The UAV according to claim 12, wherein the cantilever comprises a first side wall, a second side wall and an arc-shaped plate, and each of the first side wall and the second side wall comprising a first end and a second end opposite to each other, wherein one end of the arc-shaped plate is connected to the first end of the first side wall, another end of the arc-shaped plate is connected to the first end of the second side wall, the second end of the first side wall is connected to the second end of the second side wall, and the arc-shaped plate, the first side wall, and the second side wall jointly define the cavity.

14. The UAV according to claim 13, wherein a thickness of each of the first side wall, the second side wall, and the arc-shaped plate is in a range of 0.9 mm to 1.2 mm.

15. The UAV according to claim 9, wherein the UAV arm is made of an insulating material.

16. The UAV according to claim 9, wherein an outer surface of the UAV arm is covered with a protective coating.

* * * * *